(12) United States Patent
Khan (10) Patent No.: US 11,326,447 B2
(45) Date of Patent: May 10, 2022

(54) WELLBORE STABILITY PREDICTION

(71) Applicant: Saudi Arabian Oil Company, Dhahran (SA)

(72) Inventor: Khaqan Khan, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 266 days.

(21) Appl. No.: 16/512,154

(22) Filed: Jul. 15, 2019

(65) Prior Publication Data

US 2021/0017857 A1  Jan. 21, 2021

(51) Int. Cl.
*E21B 49/00* (2006.01)
*G06F 17/11* (2006.01)

(52) U.S. Cl.
CPC .......... *E21B 49/006* (2013.01); *E21B 49/003* (2013.01); *G06F 17/11* (2013.01)

(58) Field of Classification Search
None
See application file for complete search history.

(56) References Cited

U.S. PATENT DOCUMENTS

| | | | |
|---|---|---|---|
| 6,179,069 B1 | 1/2001 | Zheng | |
| 7,066,019 B1* | 6/2006 | Papanastasiou | ........ E21C 39/00 |
| | | | 73/152.59 |
| 9,646,115 B2 | 5/2017 | Frydman | |
| 2006/0131074 A1* | 6/2006 | Calhoun | ............... E21B 49/006 |
| | | | 175/50 |
| 2006/0149478 A1* | 7/2006 | Calhoun | ................ E21B 44/00 |
| | | | 702/9 |
| 2008/0319675 A1* | 12/2008 | Sayers | ..................... G01V 1/50 |
| | | | 702/11 |
| 2013/0275099 A1 | 10/2013 | Frydman | |
| 2017/0058668 A1* | 3/2017 | Paul | ....................... E21B 43/26 |

FOREIGN PATENT DOCUMENTS

| | | | |
|---|---|---|---|
| CN | 1598529 A | * | 3/2005 |
| CN | 105952445 A | * | 9/2016 |

(Continued)

OTHER PUBLICATIONS

C. Chang et al., Empirical relations between rock strength and physical properties in sedimentary rocks, Journal of Petroleum Science and Engineering, 51 (2006) 223-237 (Year: 2006).*

(Continued)

*Primary Examiner* — Lina M Cordero
(74) *Attorney, Agent, or Firm* — Fish & Richardson P.C.

(57) ABSTRACT

Disclosed are methods, systems, and computer-readable medium to perform operations including: determining a state of in-situ earth stresses around a wellbore located in a formation; transforming the in-situ earth stresses from a global Cartesian coordinate system to a local wellbore coordinate system; calculating, based on the transformed in-situ earth stresses in the local wellbore coordinate system, principal stresses around the wellbore; generating, using a failure criterion that incorporates (i) principal stresses, (ii) mud weight, and (iii) rock strength, a function for calculating a rock compressive failure; and predicting, using the function, a failure zone around the wellbore.

17 Claims, 9 Drawing Sheets
(4 of 9 Drawing Sheet(s) Filed in Color)

(56) References Cited

FOREIGN PATENT DOCUMENTS

| GB | 2351350 | 12/2000 |
|---|---|---|
| WO | WO 2017035371 | 3/2017 |

OTHER PUBLICATIONS

David Hart, Lecture 9—Introduction to Rock Strength, Univ. of Wisconsin, Jan. 7, 2009 (Year: 2009).*

Colmenares, L.B., Zoback, M.D., 2002. A statistical evaluation of intact rock failure criteria constrained by polyaxial test data for five different rocks. Int. J. Rock Mech. Min. Sci. 39, 695-729 (Year: 2002).*

Joao Paulo Castagnoli, Cyrille Montesinos, and Diego Muñoz, Drilling Geomechanics Salt Creep Monitoring: How to Optimize Mud Weight in Real Time and Get a Safe Time Window While Drilling, Tripping, Running and Cementing Casing in Salt Formations, Search and Discovery Article #41954 (Year: 2016).*

Adnoy and Ong, "Introduction to special issue on borehole stability," Journal of Petroleum Science Engineering, vol. 38, No. 3-4, 2003, 4 pages.

Bradley, "Failure of inclined wellbores," Journal of Energy Resource Technology, vol. 101, No. 4, Dec. 1979, 8 pages.

Chabook et al., "The role of rock strength criterial in wellbore stability and trajectory optimization," Int. Journal of Rock Mechanics and Mineral Science, vol. 80, 2015, 6 pages.

Fjar et al., "Petroleum Related Rock Mechanics," 2nd Edition Elsevier, Amsterdam, 2008, 145-150, 6 pages.

Ma et al., "Wellbore stability analysis and wellpath optimization based on thebreakout width model and Mogi-Coulomb criterion," Journal of Petroleum Science and Engineering, vol. 135, 2015.

Manshad and Jalalifar, "Analysis of vertical, horizontal and deviated wellbores stability by analytical and numerical methods," Journal of Petroleum Exploration and Production Technology, vol. 4, Dec. 2014, 12 pages.

Zhou et al, "On the mechanical stability of inclined wellbores," SPE Drilling and Completion, Jun. 1996, 7 pages.

PCT International Search Report and Written Opinion issued in International Application No. PCT/US2020/041903 dated Oct. 20, 2020, 14 pages.

GCC Examination Report in Gulf Cooperation Council Appln. No. GC 2020-40089, dated Oct. 10, 2021, 4 pages.

* cited by examiner

WELLBORE STABILITY PREDICTION

TECHNICAL FIELD

This disclosure relates to wellbore stability predictions.

BACKGROUND

Wellbores are routinely drilled in subsurface formations for hydrocarbon extraction. Geomechanical knowledge of the subsurface formations is critical for determining an optimum mud weight that maintains wellbore stability during drilling. Unstable wellbore results in compressive rock failure at the wellbore wall called breakouts, which can cause generation of excessive cuttings and cavings volume downhole. This excessive rock volume can be difficult to clean out effectively, which can cause drilling problems such as tight hole, packoff, and stuck pipe. These drilling problems resulting from unstable wellbores can, among other effects, significantly increase drilling non-productive time, thereby causing high well construction costs.

In order to avoid drilling problems resulting from unstable wellbores, a wellbore stability can be predicted. However, currently available techniques for wellbore stability predictions rely on either predicting breakout width or yield (damaged) zone around the wellbore. These methods have several limitations when compared to actual measurements of wellbore stability indicators, such as caliper logs.

SUMMARY

The present disclosure describes a methodology of calculating wellbore stability. In an embodiment, the methodology calculates a failure zone around a wellbore and predicts a maximum diameter of the wellbore at each depth along a wellbore trajectory. The maximum diameter can be compared with observed hole diameter routinely available in the form of caliper logs. The disclosed methodology calibrates geomechanical models and predicts mud weights for safe drilling operations more reliably and accurately than currently available techniques.

Aspects of the subject matter described in this specification may be embodied in methods that include the actions of: determining a state of in-situ earth stresses around a wellbore located in a formation; transforming the in-situ earth stresses from a global Cartesian coordinate system to a local wellbore coordinate system; calculating, based on the transformed in-situ earth stresses in the local wellbore coordinate system, principal stresses around the wellbore; generating, using a failure criterion that incorporates (i) principal stresses, (ii) mud weight, and (iii) rock strength, a function for calculating a rock compressive failure; and predicting, using the function, a failure zone around the wellbore.

The previously-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium. These and other embodiments may each optionally include one or more of the following features.

In a first aspect, calculating, based on the predicted failure zone around the wellbore, maximum wellbore diameter at one or more depths along a wellbore trajectory.

In a second aspect, comparing the predicted borehole diameter with a measured actual caliper log; and based on the difference between the predicted borehole diameter and the measured actual caliper log, calibrating a geomechanical model of the formation.

In a third aspect, determining, based on the rock compressive failure, a lower limit of mud weight of a drilling fluid to use when drilling the well bore to maintain wellbore stability.

In a fourth aspect, where the failure criterion is a Mohr Coulomb failure criterion.

In a fifth aspect, where the in-situ earth stresses are: vertical stress ($\sigma_v$), minimum horizontal stress ($\sigma_h$), and maximum horizontal stress ($\sigma_H$).

In a sixth aspect, where the function is $$f\left(\sigma_1 - UCS - \sigma_3 \tan^2\left(45 + \frac{\phi}{2}\right)\right) = 0,$$

and where UCS is an unconfined compressive strength of the formation, $\phi$ is an angle of internal friction, $\sigma_1$ is a maximum principal stress, and $\sigma_3$ is a minimum principal stress.

The subject matter described in this specification can be implemented in particular implementations, so as to realize one at least the following advantage. The disclosed methodology calibrates geomechanical models and predicts mud weights for safe drilling operations more reliably and accurately than currently available techniques.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following detailed description describes systems and methods for full wavefield de-aliasing, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

Knowledge of the geomechanics of an oil and gas field is useful for many reasons. For example, knowledge of the geomechanics is important for determining mud weight, which is an important drilling parameter. Excessively high mud weight can cause mud losses and formation damage and low mud weight can trigger wellbore instability issues that result in the development of breakouts at the wellbore wall and generation of a high volume of formation cuttings/cavings downhole. The excessive rock volume can be difficult to clean out effectively, which can cause drilling problems, such as tight hole, packoff, and stuck pipe. These drilling problems, which result from unstable wellbores, can significantly increase drilling non-productive time, thereby causing high well construction costs.

Given the significance of geomechanics on wellbore stability, generating an accurate geomechanical model is beneficial for determining mud weight for a successful drilling operation. In practice, there are two methods, namely breakout width and depth of damage, that are used to constrain and calibrate geomechanical models to predict safe mud weight. One disadvantage of both methods is that their output lacks direct comparison with parameters acquired from well or logs data, which makes the output difficult to calibrate or verify. In particular, breakout width has been used as a calibration parameter to compare with measured caliper data as a means for wellbore stability prediction. However, the relationship between breakout width and caliper data is not fully developed. In addition, image data (the input for calculating breakout width) is not always acquired, its coverage may be limited to a small section of the wellbore and, in many cases, its quality can be poor. Therefore, breakout width calculations are impossible or highly uncertain. The depth of damage model relies on a normalized wellbore diameter for wellbore stability assessment. However, this methodology also lacks direct comparison of predictions with a physical parameter acquired from well logs data.

Disclosed are methods and systems for determining an extent of wellbore failure. In an implementation, the extent of wellbore failure is determined as a function of in-situ stresses, rock strength properties, and wellbore geometry. The inputs are integrated into a three-dimensional (3D) stress distribution around the wellbore. The 3D stress distribution together with rock strength properties are then incorporated into an appropriate rock failure criterion to determine a failure zone around the wellbore. From the failure zone, a predicted borehole diameter can be determined. The predicted borehole diameter can be directly compared to measured caliper data, which is available in most logging runs as a basic measurement. Thus, the calculated wellbore diameter can be verified or calibrated using actual measured data. Additionally, based on the calculated failure zone, one or more actions can be performed. For example, the mud weight for a specific trajectory can be calculated. Then, the mud weight in the wellbore during drilling may be adjusted to the calculated mud weight to keep wellbore stable.

Figure 1:
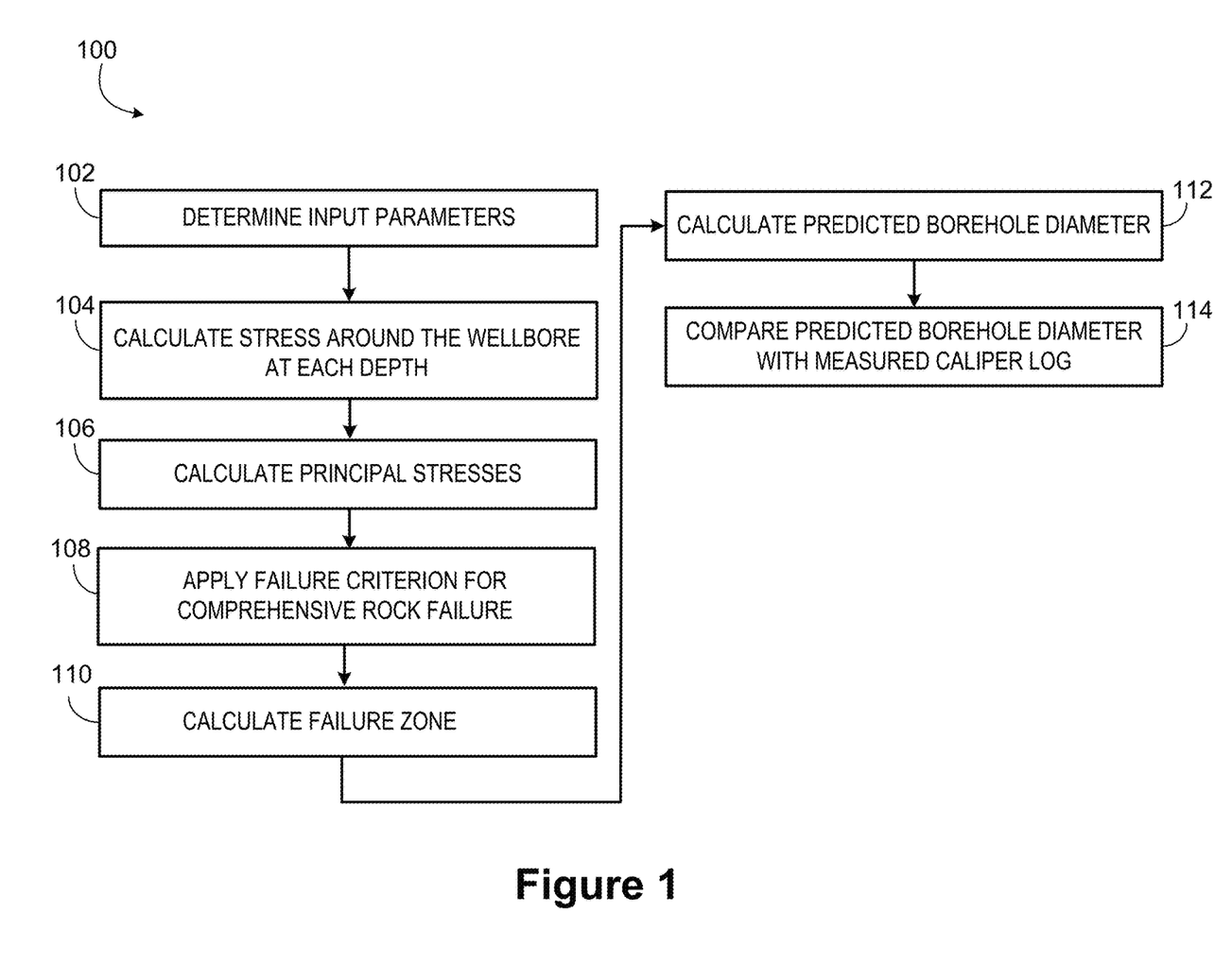
FIG. 1 illustrates a block diagram of an example workflow for predicting a stability of a wellbore, according to some implementations of the present disclosure.

FIG. 1 illustrates a block diagram of an example workflow 100 for predicting a stability of a wellbore, according to some implementations. For clarity of presentation, the description that follows generally describes the workflow 100 in the context of the other figures in this description. For example, the workflow 100 can be performed by a computer system 800 described in FIG. 8. However, it will be understood that the workflow 100 may be performed, for example, by any suitable system, environment, software, and hardware, or a combination of systems, environments, software, and hardware, as appropriate. In some implementations, various steps of the workflow 100 can be run in parallel, in combination, in loops, or in any order.

At step 102, the workflow 100 involves determining input parameters. In an implementation, the input parameters include three in-situ earth stresses: vertical stress ($\sigma_v$), minimum horizontal stress ($\sigma_h$), and maximum horizontal stress ($\sigma_H$). These in-situ stresses can be calculated based on log data from an oil and gas well using techniques known to one of ordinary skill in the art. Additionally, the input parameters can include formation pore pressure ($P_p$), rock strength parameters (for example, unconfined compressive strength (UCS) and rock internal friction angle ($\phi$)), mud pressure in the wellbore ($P_m$), Poisson's ratio of the rock material (v), an azimuth maximum horizontal stress ($\alpha_H$) measured clockwise from geographic North (N), wellbore inclination (i) measured from the vertical, true vertical depth (TVD), measured depth (MD), caliper logs (Cali), and wellbore azimuth ($\alpha_w$) measured clockwise from geographic North (N).

At step 104, the workflow 100 involves calculating stresses around the wellbore at each depth. In an implementation, a first step of calculating the wellbore stresses is to transform the known in-situ earth stresses from a global Cartesian coordinate system to a wellbore coordinate system. This is achieved by transforming the in-situ earth stresses from the global Cartesian coordinate system to a local Cartesian system and from local Cartesian system to the wellbore (for example, cylindrical) coordinate system. Generally, the effect of the three given in-situ earth stresses on the wellbore wall depends on the wellbore profile, including wellbore deviation (angle from vertical) and wellbore azimuth. For some combinations of wellbore deviation and azimuth, the effect can be more pronounced (that is, a high concentration of forces/stresses) than others. Accordingly, at each depth within the zone of interest along the well trajectory, the effect of the in-situ earth stresses is modeled on the wellbore wall by transforming the stresses from the global Cartesian coordinate system to the local wellbore coordinate system.

Figure 2:
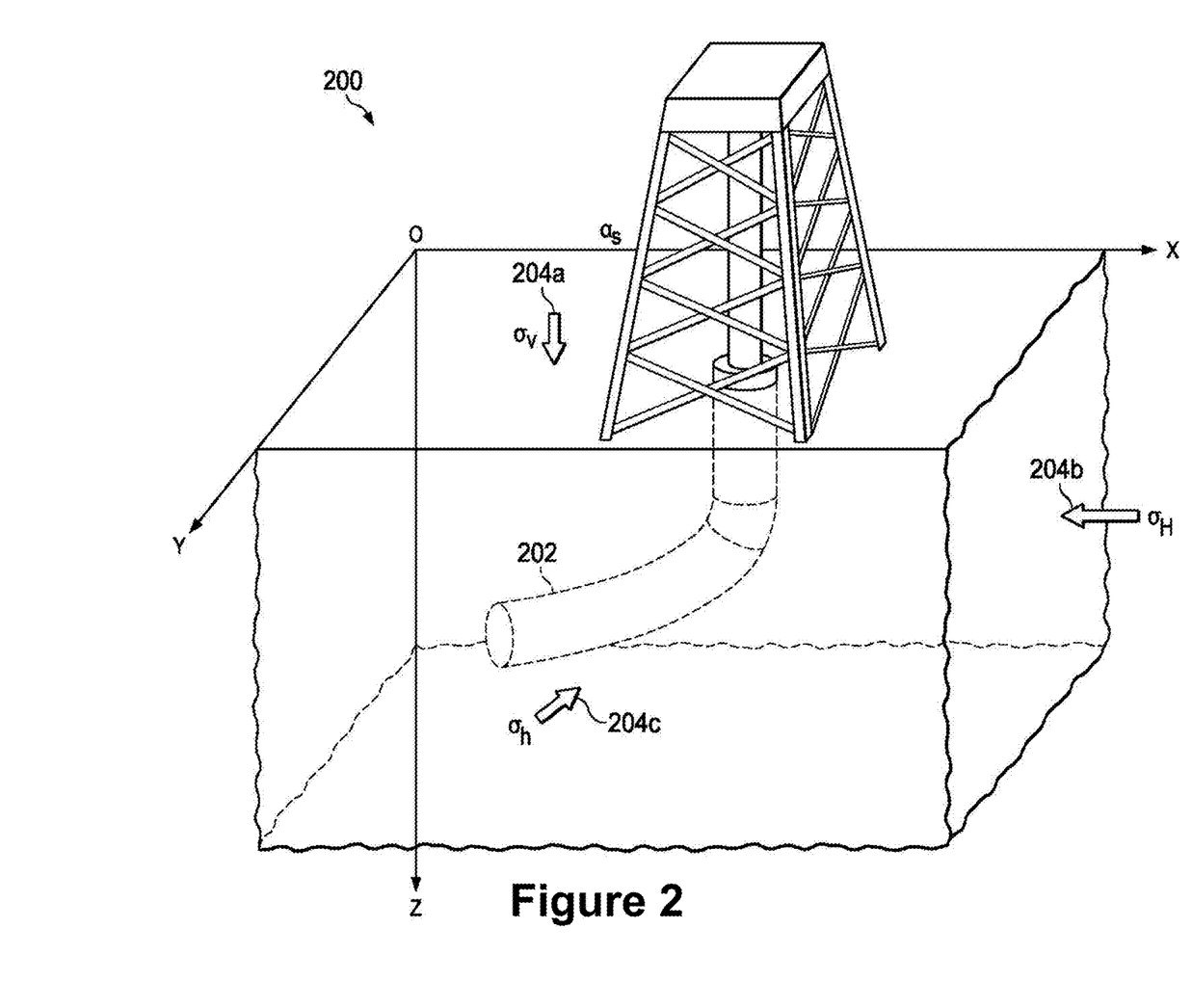
FIG. 2 illustrates three in-situ stresses in a field in a given subsurface formation and an inclined wellbore placed in the given formation, according to some implementations of the present disclosure.

FIG. 2 illustrates three in-situ stresses in a field 200, according to some implementations. As shown in FIG. 2, a wellbore 202 is located in the field 200. The three in-situ earth stresses in the field 200 are represented by arrows 204a, 204b, and 204c. In particular, arrow 204a represents the vertical stress ($\sigma_v$), arrow 204b represents the maximum horizontal stress ($\sigma_H$), and arrow 204c represents the minimum horizontal stress ($\sigma_h$). The relative magnitudes of these stresses can be used to define three stress regimes: a normal faulting stress regime ($\sigma_v > \sigma_h > \sigma_H$), a strike slip stress regime ($\sigma_H > \sigma_v > \sigma_h$), and a reverse faulting stress regime ($\sigma_H > \sigma_h > \sigma_v$). These stress regimes can vary depending on the geological conditions.

In an implementation, transforming the three in-situ earth stresses from the global Cartesian coordinate system (X, Y, Z), shown in FIG. 2, to a local wellbore coordinate system (X',Y',Z') is performed using equations (1)-(6):

$$\sigma_{x'} = \sigma_H \cos^2 i \cos^2 \alpha + \sigma_h \cos^2 i \sin^2 \alpha + \sigma_v \sin^2 i \quad (1)$$

$$\sigma_{y'} = \sigma_H \sin^2 \alpha + \sigma_h \cos^2 \alpha \quad (2)$$

$$\sigma_{z'} = \sigma_H \sin^2 i \cos^2 \alpha + \sigma_h \sin^2 i \sin^2 \alpha + \sigma_v \cos^2 i \quad (3)$$

$$\tau_{x'y'} = \sigma_H \cos i \cos \alpha \sin \alpha + \sigma_h \cos i \sin \alpha \cos \alpha \quad (4)$$

$$\tau_{y'z'} = -\sigma_H \sin i \sin \alpha \cos \alpha + \sigma_h \sin i \sin \alpha \cos \alpha \quad (5)$$

$$\tau_{z'x'} = \sin i \cos i \, \sigma_H \cos^2 \alpha + \sigma_h \sin i \cos i \sin^2 \alpha - \sigma_v \sin i \cos i \quad (6)$$

In these equations, $\sigma_{x'}$ is a normal stress along the X' axis, $\sigma_{y'}$ is a normal stress along the Y' axis, $\sigma_{z'}$ is a normal stress along the Z' axis, $\tau_{x'y'}$ is a shear stress along the X',Y' axes, $\tau_{y'z'}$ is a shear stress along the Y', Z' axes, $\tau_{z'x'}$ is a shear stress along the Z', X' axes, and i is a wellbore inclination (degrees) from the vertical. Furthermore, in these equations, $\alpha$ is the azimuth of the wellbore (in degrees) measured clockwise from the maximum horizontal stress direction and is calculated using equation (7):

$$\alpha = \alpha_w - \alpha_H \quad (7)$$

In equation (7), $\alpha_w$ is a wellbore azimuth (in degrees) measured clockwise from geographic North (N) and $\alpha_H$ is a maximum horizontal stress azimuth (in degrees) measured clockwise from geographic (N). Note that a conversion between degrees and radians is performed for overall consistency of units, wherever applicable.

Figure 3:
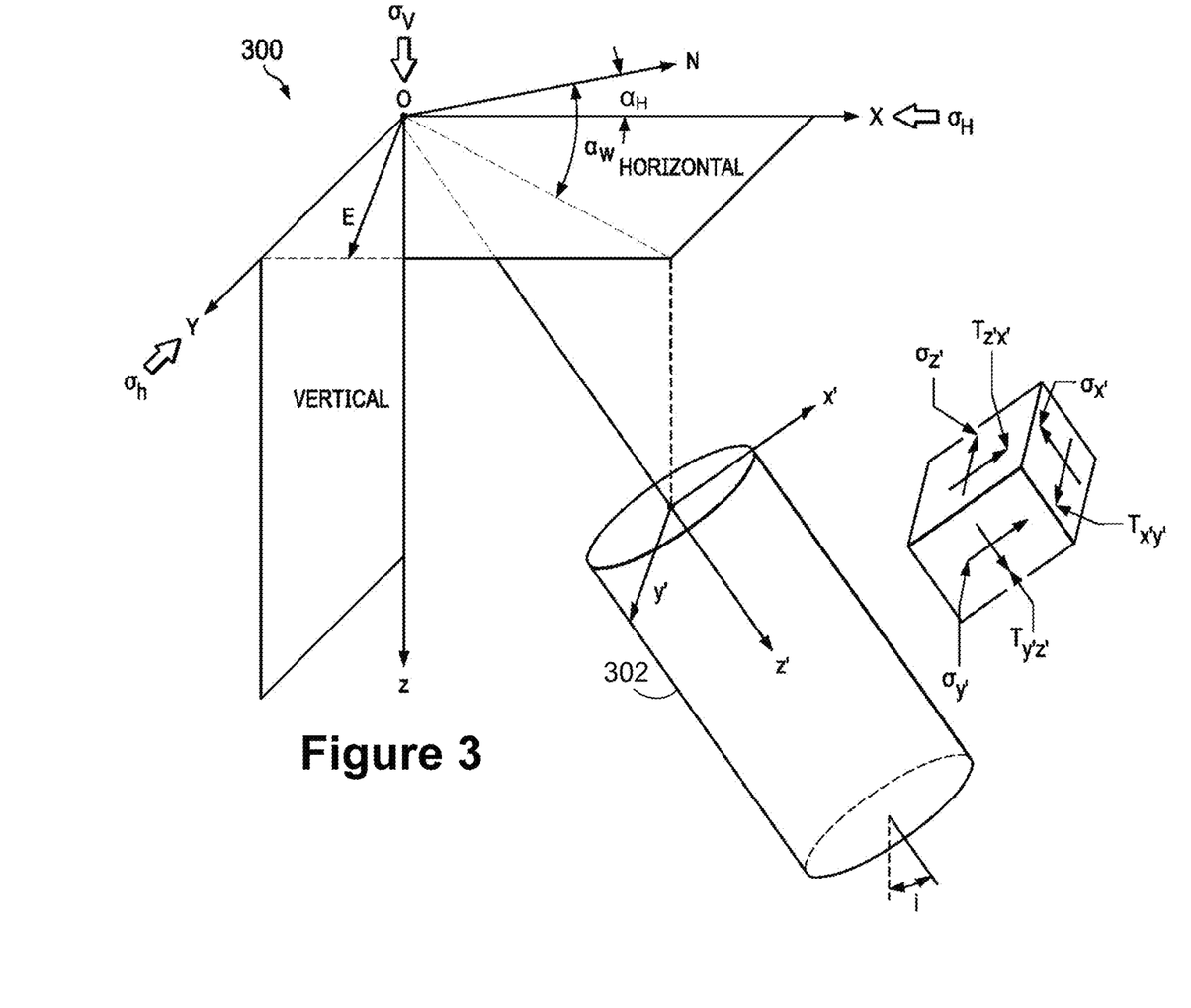
FIG. 3 illustrates a transformation of the three in-situ earth stresses from a global Cartesian coordinate system to a local wellbore coordinate system, according to some implementations of the present disclosure.

FIG. 3 illustrates a representation 300 of the transformation of the three in-situ earth stresses from the global Cartesian coordinate system to the local wellbore coordinate system, according to some implementations. In particular, FIG. 3 illustrates a generalized case of an inclined wellbore placed in a given in-situ stress field and illustrates how the effect of in-situ stresses is developed at the wellbore wall. In FIG. 3, the inclined wellbore is represented by a cylinder 302. FIG. 3 illustrates how the in-situ earth stresses $\sigma_v$, $\sigma_h$, and $\sigma_H$, along global Cartesian coordinates are transformed into $\sigma_{x'}$, $\sigma_{y'}$, $\sigma_{z'}$, $\tau_{x'y'}$, $\tau_{y'z'}$, and $\tau_{z'x'}$ along the local Cartesian coordinate system at the wellbore wall.

Figure 4:
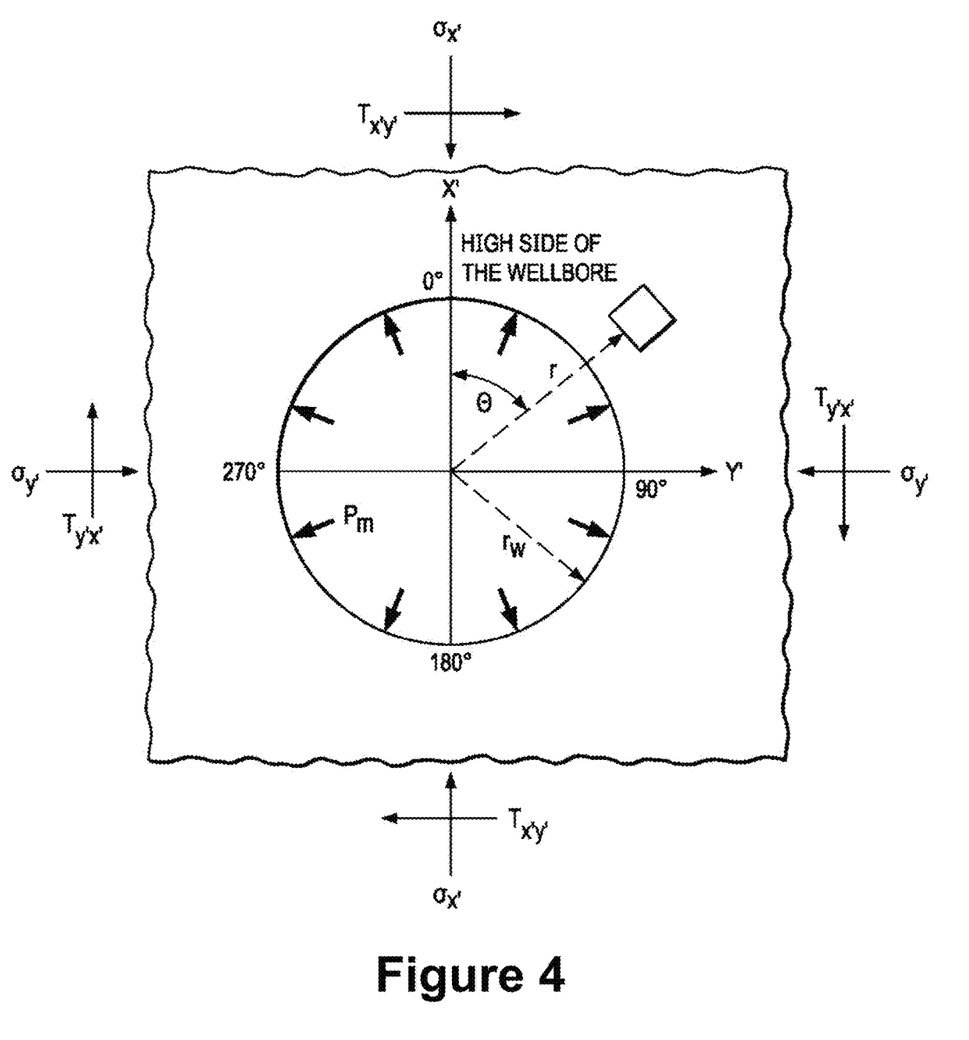
FIG. 4 illustrates a cross-sectional view of the transformed in-situ earth stresses at a wellbore wall, according to some implementations of the present disclosure.

FIG. 4 illustrates a cross-sectional-view 400 of wellbore with the transformed in-situ earth stresses, according to some implementations. In FIG. 4, the dimension Z' is along the wellbore axis (that is, perpendicular to the plane of FIG. 4), $r_w$ is a wellbore radius, r is a radial distance from the center of wellbore, $P_m$ is a mud pressure in the wellbore in pounds per square inch (psi), and the angle $\theta$ is measured clockwise from X' (that is, the high side of the wellbore as shown in FIG. 4).

Once the in-situ stresses are transformed from the global Cartesian coordinates system to the local wellbore coordinate system, a second step of calculating the stresses on the wellbore wall is performed to transform stresses to the cylindrical coordinates. In an implementation, considering a plane strain boundary condition and assuming isotropic and elastic rock medium with a Biot's coefficient of 1 and a perfect mud cake at the wellbore wall, the stresses on the wellbore are calculated using equations (8)-(13):

$$\sigma_{rr} = \frac{\sigma_{x'} + \sigma_{y'}}{2}\left(1 - \frac{r_w^2}{r^2}\right) + \frac{\sigma_{x'} - \sigma_{y'}}{2}\left(1 - \frac{4r_w^2}{r^2} + \frac{3r_w^4}{r^4}\right)\cos 2\theta + \tau_{x'y'}\left(1 - \frac{4r_w^2}{r^2} + \frac{3r_w^4}{r^4}\right)\sin 2\theta + P_m \frac{r_w^2}{r^2} - P_p \quad (8)$$

$$\sigma_{\theta\theta} = \frac{\sigma_{x'} + \sigma_{y'}}{2}\left(1 + \frac{r_w^2}{r^2}\right) - \frac{\sigma_{x'} - \sigma_{y'}}{2}\left(1 + \frac{3r_w^4}{r^4}\right)\cos 2\theta - \tau_{x'y'}\left(1 + \frac{3r_w^4}{r^4}\right)\sin 2\theta - P_m \frac{r_w^2}{r^2} - P_p \quad (9)$$

$$\sigma_{z'z'} = \sigma_{z'} - 2\nu(\sigma_{x'} - \sigma_{y'})\left(\frac{r_w^2}{r^2}\right)\cos 2\theta - 4\nu\tau_{x'y'}\left(\frac{r_w^2}{r^2}\right)\sin 2\sigma - P_p \quad (10)$$

$$\tau_{r\theta} = \left(\tau_{x'y'}\cos 2\theta - \frac{\sigma_{x'} - \sigma_{y'}}{2}\sin 2\theta\right)\left(1 + \frac{2r_w^2}{r^2} - \frac{3r_w^4}{r^4}\right) \quad (11)$$

$$\tau_{rz'} = (\tau_{x'z'}\cos \theta + \tau_{y'z'}\sin \theta)\left(1 - \frac{r_w^2}{r^2}\right) \quad (12)$$

$$\tau_{\theta z'} = (\tau_{y'z'}\cos \theta - \tau_{x'z'}\sin \theta)\left(1 + \frac{r_w^2}{r^2}\right) \quad (13)$$

In equations (8)-(13), $P_m$ is a mud pressure in the wellbore, $P_p$ is a formation pore pressure, and $\nu$ is Poisson's ratio of the rock material. $\sigma_{rr}$, $\sigma_{\theta\theta}$, and $\sigma_{z'z'}$ are effective radial, tangential, and axial wellbore stresses, respectively, while $\tau_{r\theta}$, $\tau_{rz}$ and $\tau_{\theta z}$ are shear stresses.

Returning to FIG. 1, once the stresses on the wellbore are calculated, the workflow 100 involves, at step 106, calculating principal stresses from the wellbore wall to inside the formation (that is, beyond the wellbore wall and into the formation). In an implementation, the stresses around the wellbore can be further reduced to principal stresses using stress notation (14):

$$\begin{vmatrix} \sigma_{\theta\theta} - \sigma & \tau_{\theta r} & \tau_{\theta z'} \\ \tau_{r\theta} & \sigma_{rr} - \sigma & \tau_{rz'} \\ \tau_{z'\theta} & \tau_{z'r} & \sigma_{z'z'} \end{vmatrix} = 0 \quad (14)$$

Due to symmetry, $\tau_{r\theta} = \tau_{\theta r}$, $\tau_{\theta z'} = \tau_{z'\theta}$, and $\tau_{rz'} = \tau_{z'r}$. Accordingly, the solution of the determinant of the stress notation (14) can be reduced to a quadratic equation (15):

$$\sigma^3 - I_1\sigma^2 + I_2\sigma - I_3 = 0, \text{ where} \quad (15)$$

$$I_1 = \sigma_{\theta\theta} + \sigma_{rr} + \sigma_{z'z'},$$

$$I_2 = \sigma_{\theta\theta}\sigma_{rr} + \sigma_{\theta\theta}\sigma_{z'z'} + \sigma_{rr}\sigma_{z'z'} - \tau_{r\theta}^2 - \tau_{rz'}^2 - \tau_{\theta z'}^2, \text{ and}$$

$$I_3 = \sigma_{\theta\theta}(\sigma_{rr}\sigma_{z'z'} - \tau_{rz'}^2) - \tau_{r\theta}(\tau_{r\theta}\sigma_{z'z'} - \tau_{\theta z'}\tau_{\theta z'})\sigma_{\theta\theta} + \tau_{\theta z'}(\tau_{r\theta}\tau_{rz'} - \tau_{\theta z'}\sigma_{rr}).$$

The solution to the quadratic equation (15) provides three real roots called principal effective stresses ($\sigma_1$, $v_2$, $\sigma_3$). $\sigma_1$ is a maximum principal stress (in psi), $\sigma_2$ is an intermediate principal stress (in psi), and $\sigma_3$ is a minimum principal stress (in psi).

In an implementation, steps 102-106 are also referred to as steps of generating a geomechanical model of the formation for a given wellbore geometry. The geomechanical model is defined by state of stress and rock properties including transformation of stresses using one or more of the equations (1)-(15). Furthermore, the geomechanical model can be used to generate a three-dimensional (3D) stress distribution around the wellbore. Furthermore, the geomechanical model can be configured to predict the evolution of deformation, and damage in the formation based on one or more of in-situ stresses in the formation, pore pressures in the formation, properties of rock masses of formation layers, constitutive models of rock mass that describe stress-deformation-failure processes of the formation under different loading modes, mechanical properties of rock masses, mechanical properties of fractures, fluid mechanical interaction parameters, and thermal mechanical coupling parameters.

At step 108, the workflow 100 involves applying a failure criterion for compressive rock failure. In this step, the 3D stress distribution around the wellbore further incorporated into an appropriate rock failure criterion for a specific trajectory and mud weight value to be used. In an implementation, after calculating the principal stresses around the wellbore as a function of radial (r) and angular (θ) values, the rock compressive failure is defined, using the Mohr Coulomb failure criterion, as:

$$\sigma_1 = UCS + \sigma_3 \tan^2\left(45 + \frac{\phi}{2}\right) \quad (19)$$

In equation (19), UCS is an unconfined compressive strength of the rock, $\phi$ is the angle of internal friction, $\sigma_1$ is the maximum principal stress, and $\sigma_3$ is the minimum principal stress.

At step 110, the workflow 100 involves calculating a failure zone. The failure zone is a region around the wellbore where rock cannot withstand the induced stresses during drilling and fails in compression. In an implementation, from equation (19), a failure function (20), $f$, is derived as:

$$f\left(\sigma_1 - UCS - \sigma_3 \tan^2\left(45 + \frac{\phi}{2}\right)\right) = 0 \quad (20)$$

When the value of $f$ is zero or greater than zero for any point around the wellbore, it indicates that the rock at that point has yielded and compressive failure has occurred. The compressive failure will be highest at the wellbore wall and progressively decreases away from the wellbore inside the formation. Furthermore, a normalized failure zone can be calculated using equation (21):

$$\text{normalized failure zone} = \frac{D_f}{BS} \quad (21)$$

In equation (21), $D_f$ is depth of failure at the wellbore wall and BS is a bit size.

Figure 5:
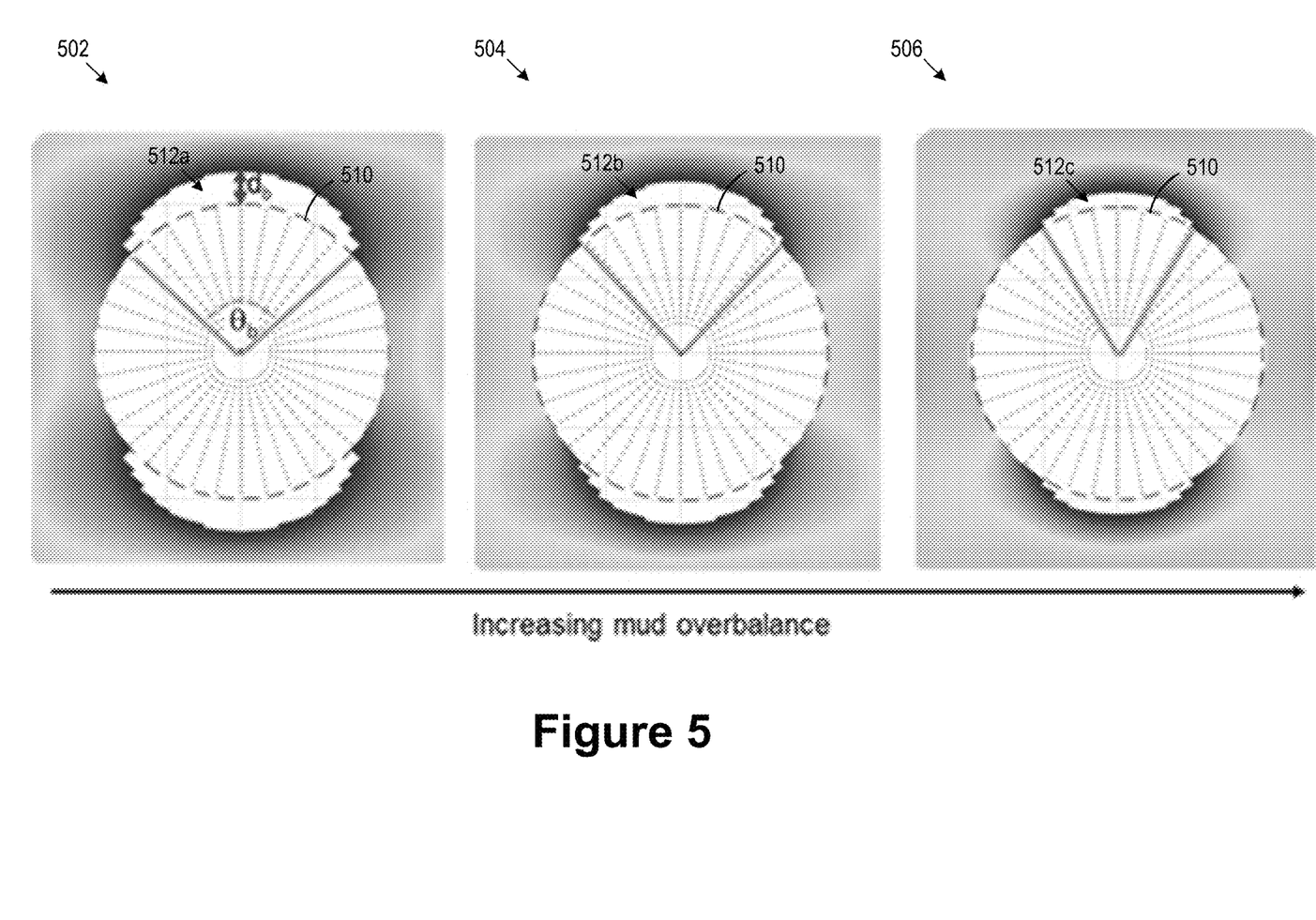
FIG. 5 illustrates an effect of mud overbalance on calculated breakout severity at a given depth for known in-situ stresses and rock strength properties, according to some implementations of the present disclosure.

FIG. 5 illustrates images that show an effect of mud overbalance on calculated breakout severity at a given depth for known in-situ stresses and rock strength properties, according to some implementations. In particular, FIG. 5 illustrates, using images 502, 504, 506, an extent of failure calculated using the failure function (20) for a given input of rock strength, in-situ stresses, mud weight and wellbore geometry (deviation and azimuth). The images 502, 504, 506 are arranged in order of increasing mud overbalance. Mud overbalance is the amount of pressure in the well bore that exceeds the pressure of fluids in the rock pores.

Each of the images 502, 504, 506 illustrates a region outside a dotted line 510 (that represents a drill bit size). This region represents the calculated breakout severity. In images 502, 504, 506 the breakout severity regions are regions 512a, 512b, 512c, respectively. As shown by these images, higher mud overbalance stabilizes the wellbore wall and reduces breakout width ($\theta_b$) and depth ($d_b$). As rock properties and in-situ stresses vary along wellbore depth, the predicted severity can vary as well. When such an analysis is performed along the wellbore, the results can show variable breakout severity across different zones due to varying rock properties, in situ stresses, and wellbore azimuth and deviation. When a caliper tool is run in an openhole for such a wellbore, one can see continuous profile of measured hole size, which can indicate zones of stable (measured hole size close to bit size) and unstable (measured hole size larger than the bit size) wellbore.

Returning to FIG. 1, at step 112, the workflow 100 involves calculating a predicted borehole diameter. In particular, the failure function and the input data are used to predict rock failure around the wellbore. For instance, the maximum depth of predicted failure zone is added to the bit size to calculate the predicted borehole diameter.

At step 114, the workflow 100 involves comparing the predicted borehole diameter with the measured actual caliper log. The comparison with the measured caliper log serves as a means of model validity and calibration. For instance, the comparison can be used to calibrate a geomechanical model of the wellbore. Calibrating the model may involve changing different model input parameters within acceptable limits. The calculations and calibration can be iteratively repeated until a reasonable match between the predicted borehole and the actual caliper log is obtained. For model validation, the input parameters are chronologically calculated and calibrated with corresponding available data (that is, formation pressure, leak-off test, formation breakdown pressure, core measurements, among other examples) for each of the parameters. Among these parameters, the maximum horizontal stress magnitude is the most uncertain as there is no direct measurement available to obtain its value. Hence, in a final step of model calibration, its value is changed within some limits of geological understanding for a given stress regime to achieve its upper and lower bounds, thereby obtain model calibration.

The results of the predicted caliper are shown in FIGS. 6A-6B and 7A-7B for two wells along with the measured actual caliper log. In these figures, the difference between the predicted and measured calipers are shown in window "Track-2." A darker color is indicative of a caliper difference (between measured and predicted) that is less than 0.5 inches, a lighter color is indicative of a caliper difference between 0.5 and 1.5 inches, and a lightest color is indicative of a caliper difference greater than 1.5 inches. The input for rock strength properties and in situ stresses are also displayed in Tracks 3-5.

Figure 6A:
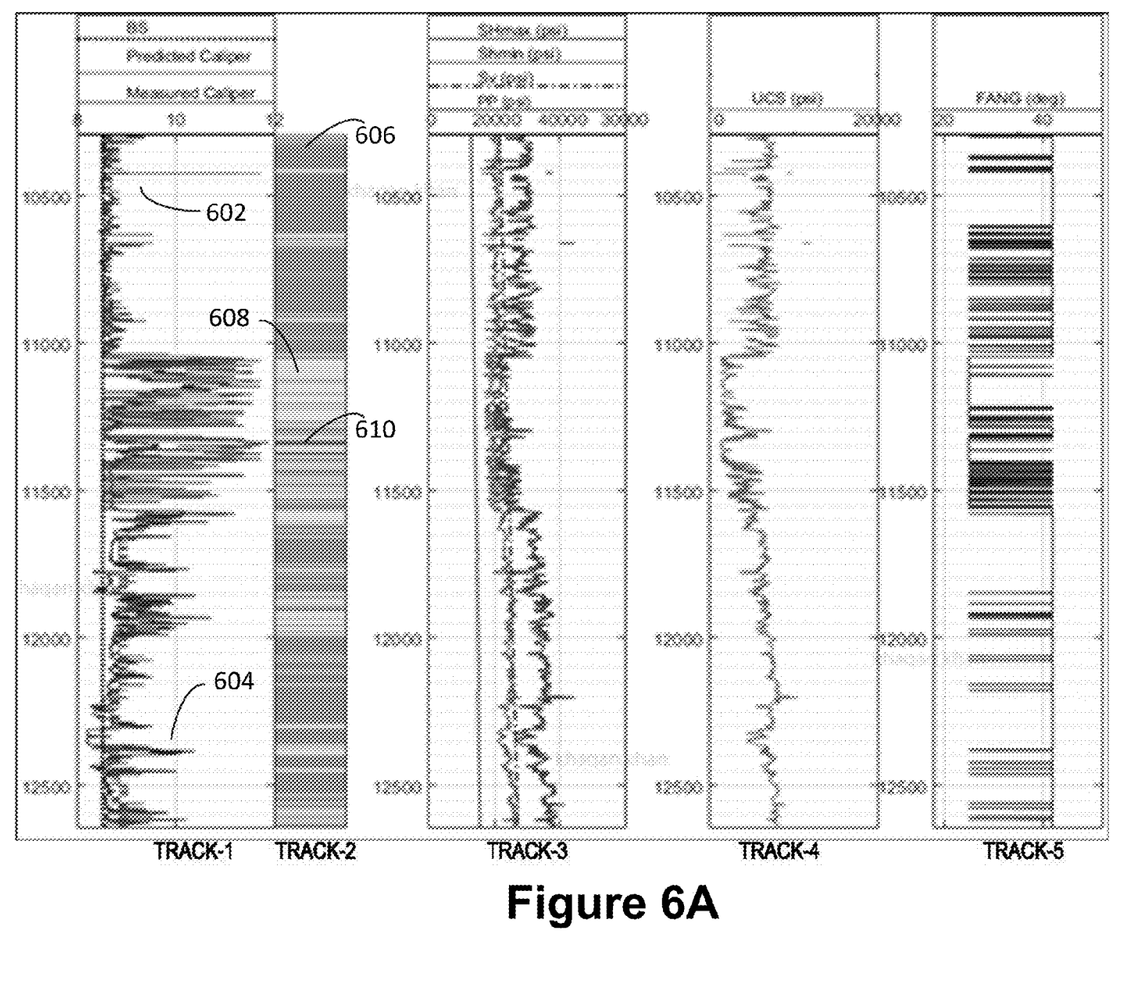
FIG. 6A illustrates (i) a comparison of a predicted borehole diameter with actual caliper data along depth in a given wellbore and (ii) input parameters of geomechanical model for the given well, according to some implementations of the present disclosure.
Figure 6B:
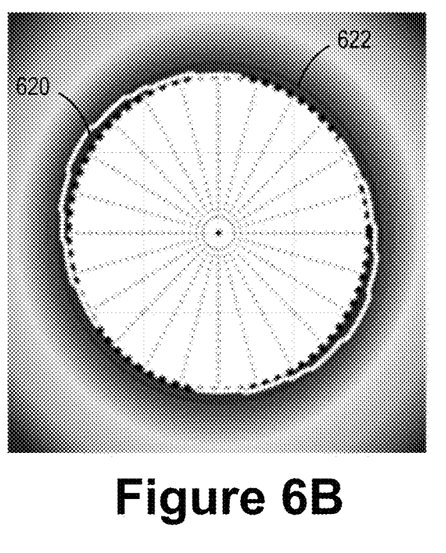
FIG. 6B illustrates a comparison of a predicted borehole diameter with actual caliper at a given depth for the wellbore of FIG. 6A, according to some implementations of the present disclosure.

FIG. 6A illustrates a comparison of predicted caliper (curve 602) and actual caliper (curve 604) shown in Track-1 for the in situ stresses and rock strength parameters shown in Tracks 3-5. Track-2 shows the difference between the predicted and measured calipers. For instance, regions 606 are indicative of a difference that is less than 0.5 inches, regions 608 are indicative of a difference between 0.5 and 1.5 inches, and region 610 is indicative of a difference of greater than 1.5 inches. FIG. 6B illustrates a comparison of an extent of a failure zone, depicted as thick white line 620, and an actual caliper, depicted as line 622, at a depth of 11074 feet.

Figure 7A:
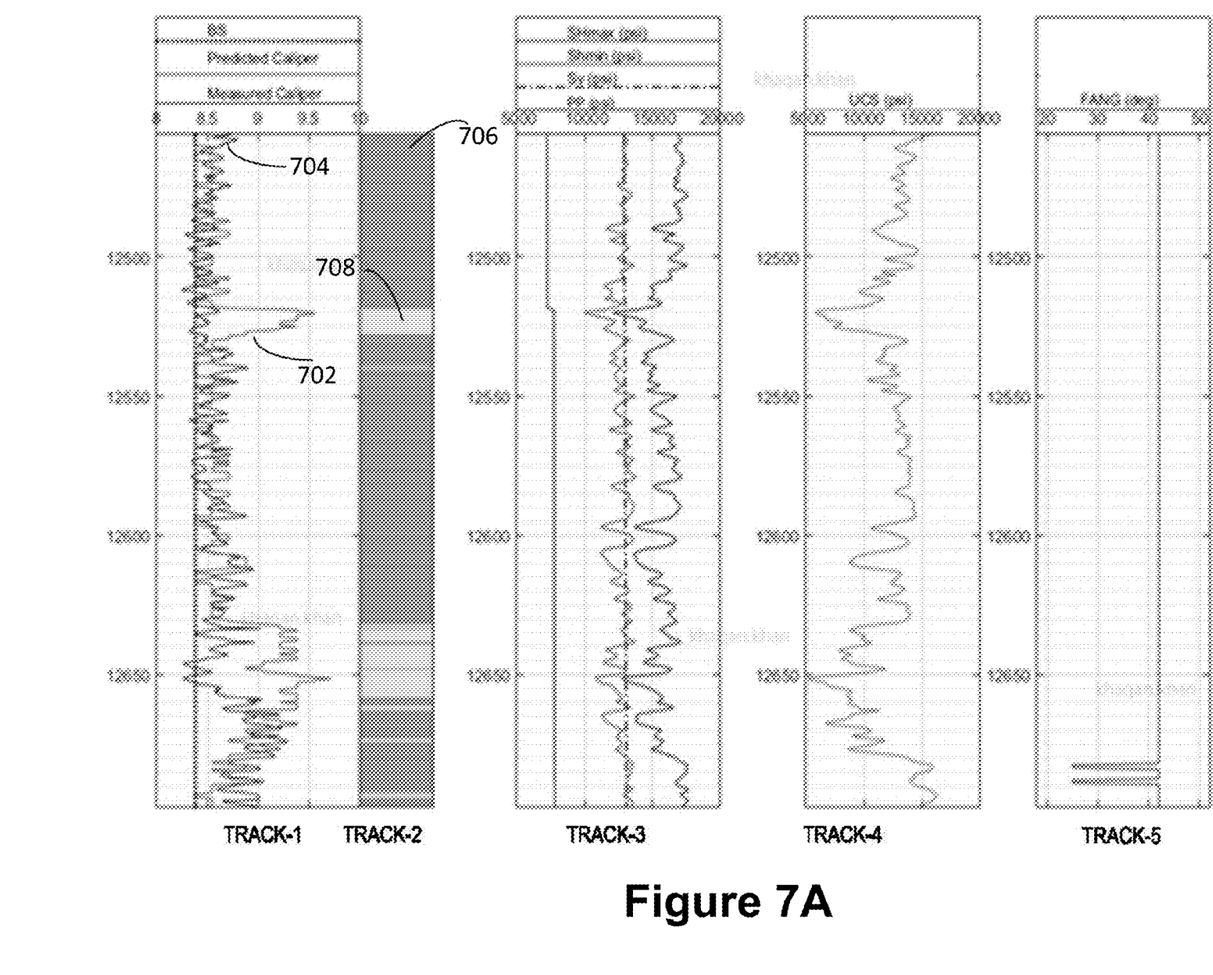
FIG. 7A illustrates (i) a comparison of a predicted borehole diameter with actual caliper data along depth in a given wellbore and (ii) input parameters of geomechanical model for the given well, according to some implementations of the present disclosure.
Figure 7B:
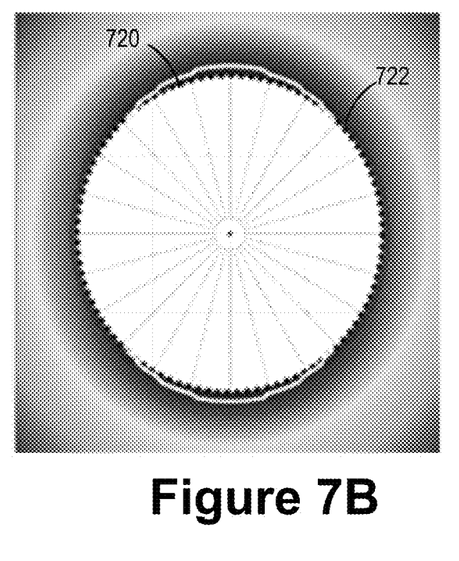
FIG. 7B illustrates a comparison of a predicted borehole diameter with actual caliper at a given depth for the wellbore of FIG. 7A, according to some implementations of the present disclosure.

FIG. 7A illustrates a comparison of predicted caliper (curve 702) and actual caliper (curve 704) shown in Track-1 for the in situ stresses and rock strength parameters shown in Tracks 3-5. Track-2 shows the difference between the predicted and measured calipers. For instance, region 706 is indicative of a difference that is less than 0.5 inches and region 708 is indicative of a difference between 0.5 and 1.5 inches. FIG. 7B illustrates a comparison of an extent of a failure zone, depicted as thick white line 720, and an actual caliper, depicted as line 722, at a depth of 12610 feet.

The example workflow 100 shown in FIG. 1 can be modified or reconfigured to include additional, fewer, or different steps (not shown in FIG. 1), which can be performed in the order shown or in a different order. As an example, after step 114, the workflow 100 may involve recommending mud weights for a planned well to achieve wellbore condition. Additionally, the workflow 100 may involve controlling, based on the mud weight, a component of the drilling system to adjust at least one of the drilling parameters. In an example, based on the mud weight, the drilling system determines a maximum rate of penetration. In another example, based on the recommended mud weight, the drilling system adjusts the mud weight in the wellbore. In order to adjust the mud weight, one or more equipment or tools of the drilling system can be controlled. For instance, a mud pump can be controlled to adjust the density. As another example, soluble salts or solids can be added to the drilling fluid to adjust the density.

The mud weight can be determined because, for the given in-situ stresses, the failed diameter depends on the mud weight used during drilling. Therefore, adjusting the value of the mud weight, one can reach to the point where predicted and measured diameters are comparable.

In some implementations, one or more of the steps shown in FIG. 1 can be repeated or reiterated, for example, until a terminating condition is reached. In some implementations, one or more of the individual steps shown in FIG. 1 can be executed as multiple separate steps, or one or more subsets of the steps shown in FIG. 1 can be combined and executed as a single step. In some implementations, one or more of the individual steps shown in FIG. 1 may also be omitted from the example workflow 100.

Figure 8:
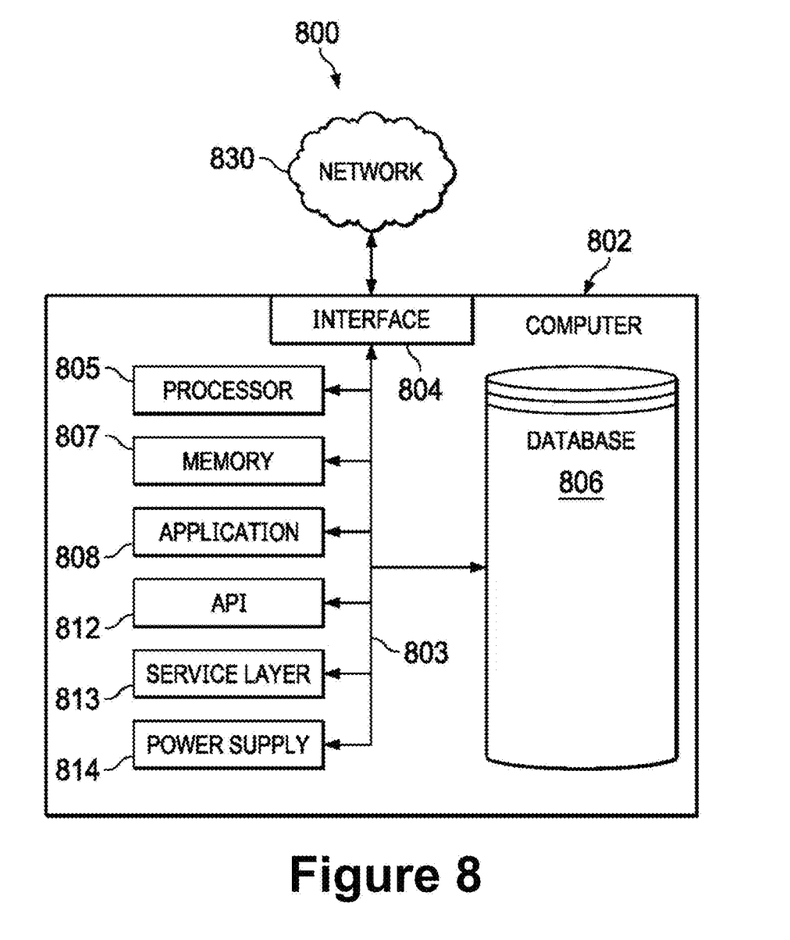
FIG. 8 is a block diagram showing an example computer system used to provide computational functionalities associated with described algorithms, methods, functions, processes, flows, and procedures as described in the instant disclosure, according to some implementations.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a high level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network.

Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

I claim:

1. A method comprising:
    determining in-situ earth stresses around a wellbore located in a formation;
    transforming the in-situ earth stresses from a global Cartesian coordinate system to a local wellbore coordinate system;
    calculating, based on the transformed in-situ earth stresses in the local wellbore coordinate system, principal stresses around the wellbore;
    generating, using a failure criterion that incorporates (i) the principal stresses, (ii) mud weight, and (iii) rock strength, a function for calculating a rock compressive failure;
    predicting, using the function, a failure zone around the wellbore;
    comparing a predicted borehole diameter from the failure zone with a measured actual caliper log of the wellbore; and
    based on the comparison between the predicted borehole diameter and the measured actual caliper log, iteratively calibrating a geomechanical model of the formation.

2. The method of claim 1, further comprising:
    calculating, based on the predicted failure zone around the wellbore, maximum wellbore diameter at one or more depths along a wellbore trajectory.

3. The method of claim 1, further comprising:
    determining, based on the rock compressive failure, a lower limit of mud weight of a drilling fluid to use when drilling the wellbore to maintain wellbore stability.

4. The method of claim 1, wherein the failure criterion is a Mohr Coulomb failure criterion.

5. The method of claim 1, wherein the in-situ earth stresses are: vertical stress ($\sigma_v$), minimum horizontal stress ($\sigma_h$), and maximum horizontal stress ($\sigma_H$).

6. The method of claim 1, wherein the function is $$f\left(\sigma_1 - UCS - \sigma_3 \tan^2\left(45 + \frac{\phi}{2}\right)\right) = 0,$$

and wherein UCS is an unconfined compressive strength of the formation, ($\phi$) is an angle of internal friction, $\sigma_1$ is a maximum principal stress, and $\sigma_3$ is a minimum principal stress.

7. A device comprising:
    one or more processors; and
    a non-transitory computer-readable storage medium coupled to the one or more processors and storing programming instructions for execution by the one or more processors, the programming instructions instructing the one or more processors to perform operations comprising:
determining in-situ earth stresses around a wellbore located in a formation;
transforming the in-situ earth stresses from a global Cartesian coordinate system to a local wellbore coordinate system;
calculating, based on the transformed in-situ earth stresses in the local wellbore coordinate system, principal stresses around the wellbore;
generating, using a failure criterion that incorporates (i) the principal stresses, (ii) mud weight, and (iii) rock strength, a function for calculating a rock compressive failure;
predicting, using the function, a failure zone around the wellbore;
comparing a predicted borehole diameter from the failure zone with a measured actual caliper log of the wellbore; and
based on the comparison between the predicted borehole diameter and the measured actual caliper log, iteratively calibrating a geomechanical model of the formation.

8. The device of claim 7, wherein the operations further comprise:
calculating, based on the predicted failure zone around the wellbore, maximum wellbore diameter at one or more depths along a wellbore trajectory.

9. The device of claim 7, wherein the operations further comprise:
determining, based on the rock compressive failure, a lower limit of mud weight of a drilling fluid to use when drilling the wellbore to maintain wellbore stability.

10. The device of claim 7, wherein the failure criterion is a Mohr Coulomb failure criterion.

11. The device of claim 7, wherein the in-situ earth stresses are: vertical stress ($\sigma_v$), minimum horizontal stress ($\sigma_h$), and maximum horizontal stress ($\sigma_H$).

12. The device of claim 7, wherein the function is $$f\left(\sigma_1 - UCS - \sigma_3 \tan^2\left(45 + \frac{\phi}{2}\right)\right) = 0,$$

and wherein UCS is an unconfined compressive strength of the formation, $\phi$ is an angle of internal friction, $\sigma_1$ is a maximum principal stress, and $\sigma_3$ is a minimum principal stress.

13. A non-transitory computer-readable medium storing instructions executable by a computer system to perform operations comprising:
determining in-situ earth stresses around a wellbore located in a formation;
transforming the in-situ earth stresses from a global Cartesian coordinate system to a local wellbore coordinate system;
calculating, based on the transformed in-situ earth stresses in the local wellbore coordinate system, principal stresses around the wellbore;
generating, using a failure criterion that incorporates (i) the principal stresses, (ii) mud weight, and (iii) rock strength, a function for calculating a rock compressive failure;
predicting, using the function, a failure zone around the wellbore;
comparing a predicted borehole diameter from the failure zone with a measured actual caliper log of the wellbore; and
based on the comparison between the predicted borehole diameter and the measured actual caliper log, iteratively calibrating a geomechanical model of the formation.

14. The non-transitory computer-readable medium of claim 13, wherein the operations further comprise:
calculating, based on the predicted failure zone around the wellbore, maximum wellbore diameter at one or more depths along a wellbore trajectory.

15. The non-transitory computer-readable medium of claim 13, wherein the operations further comprise:
determining, based on the rock compressive failure, a lower limit of mud weight of a drilling fluid to use when drilling the wellbore to maintain wellbore stability.

16. The non-transitory computer-readable medium of claim 13, wherein the failure criterion is a Mohr Coulomb failure criterion.

17. The non-transitory computer-readable medium of claim 13, wherein the in-situ earth stresses are: vertical stress ($\sigma_v$), minimum horizontal stress ($\sigma_h$), and maximum horizontal stress ($\sigma_H$).

* * * * *

UNITED STATES PATENT AND TRADEMARK OFFICE
CERTIFICATE OF CORRECTION

PATENT NO. : 11,326,447 B2
APPLICATION NO. : 16/512154
DATED : May 10, 2022
INVENTOR(S) : Khan It is certified that error appears in the above-identified patent and that said Letters Patent is hereby corrected as shown below:

In the Claims

Column 16, Line 60, Claim 6, delete "(ϕ)" and insert -- ϕ --.

Signed and Sealed this
Ninth Day of August, 2022

Katherine Kelly Vidal
Director of the United States Patent and Trademark Office